United States Patent [19]

Bonne

[11] Patent Number: 4,961,348
[45] Date of Patent: Oct. 9, 1990

[54] FLOWMETER FLUID COMPOSITION CORRECTION

[76] Inventor: Ulrich Bonne, 4936 Shady Oak Rd., Hopkins, Minn. 55343

[21] Appl. No.: 285,897

[22] Filed: Dec. 16, 1988

[51] Int. Cl.[5] .......................... G01F 1/68; G01F 15/02
[52] U.S. Cl. ............................... 73/861.02; 73/204.18
[58] Field of Search ........... 73/204.18, 204.25, 204.26, 73/204.27, 204.19, 861.02; 364/510

[56] References Cited

U.S. PATENT DOCUMENTS

| | | | |
|---|---|---|---|
| 1,769,358 | 7/1930 | Pinkerton et al. | 73/204.18 |
| 3,891,391 | 6/1975 | Boone | 73/204.18 |
| 4,478,076 | 10/1984 | Bohrer . | |
| 4,478,077 | 10/1984 | Bohrer et al. . | |
| 4,501,144 | 2/1985 | Higashi et al. . | |
| 4,555,939 | 12/1985 | Bohrer et al. . | |
| 4,599,895 | 7/1986 | Wiseman | 73/204.18 |
| 4,651,564 | 3/1987 | Johnson et al. . | |
| 4,683,159 | 7/1987 | Bohrer et al. . | |
| 4,685,311 | 8/1987 | Renken et al. | 73/204.26 X |

OTHER PUBLICATIONS

Datametrics Bulletin 600, published 1952, pp. 1-4.

*Primary Examiner*—Herbert Goldstein

[57] ABSTRACT

A method for correcting the flow measurement of a gaseous fluid of interest for changes in the composition of that fluid in a flowmeter of the microanemometer class is disclosed in which an uncorrected flow value signal for the fluid of interest in relation to a microanemometer sensor output is corrected by applying a correction factor to the flow value signal based on certain unique physical parameters of the fluid of interest which nominally include thermal conductivity, k, specific heat, $c_p$, and density, q.

22 Claims, 5 Drawing Sheets

FLOWMETER FLUID COMPOSITION CORRECTION

CROSS REFERENCE TO RELATED APPLICATION

Reference is made to co-pending related applications Ser. Nos. 07/285,890 and 07/284,894 filed of even date and assigned to the common assignee of the present application.

BACKGROUND OF THE INVENTION

1. Field of the Invention

The present invention relates to fluid flow measurement and, more particularly, addresses overcoming inaccuracies in flow measurement. The invention eliminates errors in mass and volumetric flow rates measured for gaseous fluids with respect to compositional changes in the fluid of interest.

2. Related Art

Hot film microanemometer packages for general use are known for both uni- and bi-directional flow applications. An example of such a device is illustrated and described in U.S. Pat. No. 4,501,144 to Higashi et al. The microanemometers or "microbridges" themselves are quite inexpensive to produce.

As will be described in greater detail below, such microanemometers are capable of quite accurate flow sensing when directly exposed to a stream of fluid flowing past, especially if such flow is laminar. In this manner such a sensor can be used to directly measure the dynamic flow characteristics of the fluid.

While such a sensing system can be used to approximately measure mass flow, a great deal of error has been experienced with respect to changes in composition of the measured fluid in prior devices using the system. Thus, a need has existed for a mass or volumetric flowmeter of the microanemometer class which is less sensitive to changes in the composition of the measured fluid.

SUMMARY OF THE INVENTION

In accordance with the present invention, it has been discovered that certain relationships exist between (1) the nulled flow, i.e., the flow signal corrected by subtracting the value corresponding to the signal obtained at zero flow, and (2) fluid properties including specific heat, $c_p$, thermal conductivity, $k$, and density, $q$. In addition, certain similar relationships exist between (1) the nulled sensor output, i e , the voltaic sensor signal or other related electrical measurement nulled by subtracting the value obtained at zero flow, and (2) $c_p$, $k$, and $q$.

Based on representative modeling, what appears to be gas-independent correction factors have been found. These factors are equivalent to parallel shifts of deviating log signal vs. log flow curves, until overlap with a chosen reference curve is achieved These shifts, i.e., correction factors, are then expressed in terms of power function of normalized gas properties, in relations of the form $$M_o^*/M_o = (k/k_o)^{x_1}(c_p/c_{po})^{x_2}$$

$$M_o^*/M_o = (k/k_o)^{x_1}(c_p/c_{po})^{x_2}(q/q_o)^{x_3}$$

and $$S_o^*/S_o = (k/k_o)^{y_1}(c_p/c_{po})^{y_2}$$

or $$S_o^*/S_o = (k/k_o)^{y_1}(c_p/c_{po})^{y_2}(q/q_o)^{y_3}$$

Where:
- $M^*$ = corrected mass flow
- $S^*$ = corrected output (sensor)
- $k/k_o$ = normalized thermal conductivity
- $c_p/c_{po}$ = normalized specific heat
- $q/q_o$ = normalized density
- $x_1, x_2, x_3, y_1, y_2, y_3$ are exponents The correction factors are individual with respect to gas composition and all sensor output vs. flow (mass or volumetric) curves obtained for different individual gas species are equal except for the individual constant factors.

In an illustrative embodiment the present invention makes use of a second microanemometer sensor not directly exposed to the flowing fluid, but in more remote communication with that fluid that can be used to measure certain parameters related to the fluid which require a more static environment. Such a sensor is used for the direct measurement of thermal conductivity, $k$, and specific heat, $c_p$, in accordance with a known technique which allows the accurate determination of both properties in a sample of interest using a single sensing system. In addition these properties allow the determination of the density, or $q$.

BRIEF DESCRIPTION OF THE DRAWINGS

In the drawings:

FIG. 6 shows the correlation of experimental volumetric flow measurements for various gases applying correction factors to $S_o$ and $V_o$ based on $k$ and $c_p$ to the species of FIG. 4a;

DETAILED DESCRIPTION

Figure 1:
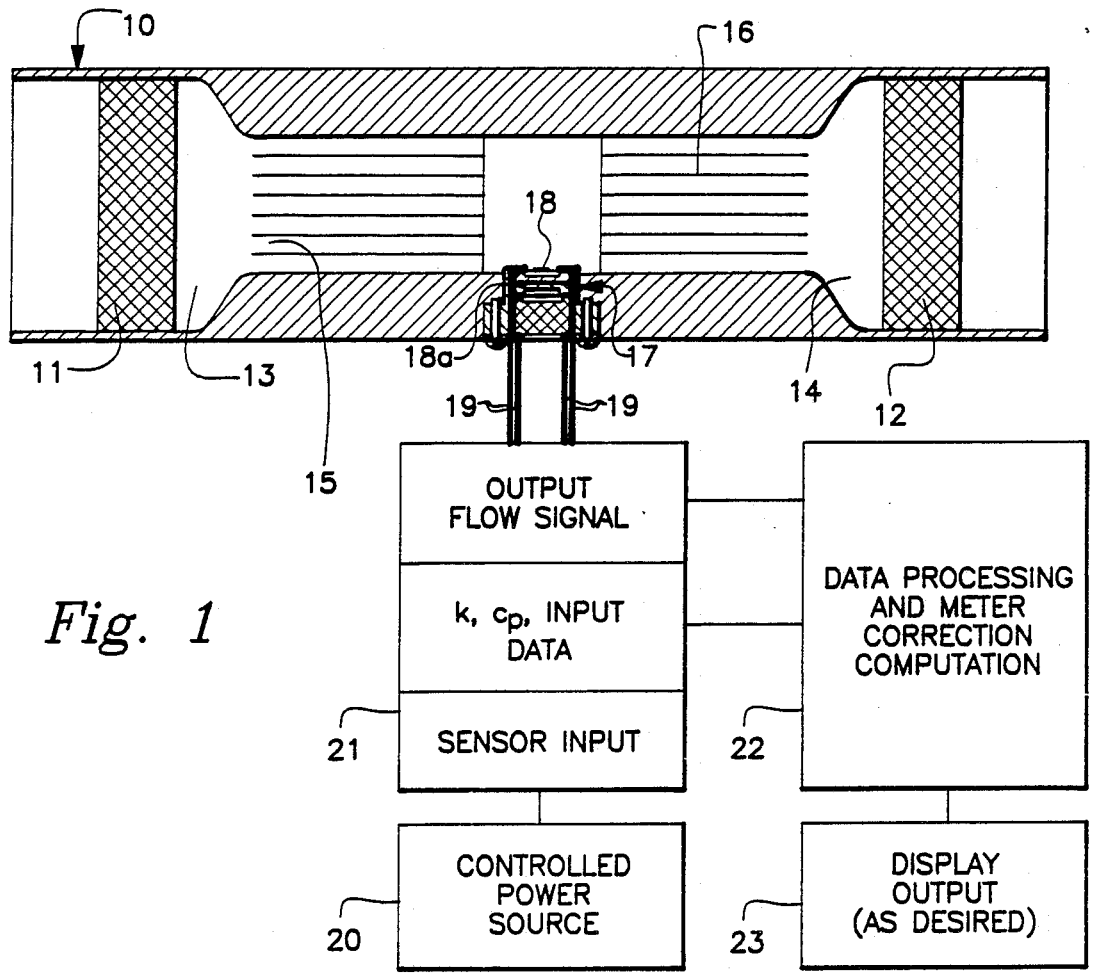
FIG. 1 includes a schematic diagram showing a sectional view of a flowmeter and a schematic of associated I/O devices for the flowmeter of the invention.

FIG. 1 depicts one embodiment of a flowmeter utilizing the concept of the present invention. The system is depicted as an integral part of a length of pipe, such as a gas pipe, or other conduit or meter body member 10 which can easily be adapted to fit into almost any existing piping scheme as between a pair of spaced unions, couplings or the like. The basic system includes a pair of filter members 11 and 12 flanking a capillary system which includes means for reducing the conduit diameter at 13 and 14 in conjunction with accessing a split bundle containing parts 15 and 16 of capillary tubes. The reducing sections 13 and 14 create a plenum effect to reduce pressure losses in conjunction with entry and exit of the fluid to the capillary bundle. This, in turn, reduces overall system pressure drop and velocity head effect.

A microbridge or microanemometer sensor package for sensing flow through the system is depicted generally at 17. It contains individual microbridge sensors 18 and 18a for dynamic and static fluid sensing respectively. Electrical connections, pins represented by 19, connect the microanemometer to a source of power for the heater or heaters shown by block 20 and external signal receiving means 21 and accompanying signal and data processing means 22 to interpret the output. The desired output may take any suitable form or display and is represented by block 23.

The remote or static microbridge or microanemometer 18a communicates with the flowing fluid of interest via a small opening in the sensor package 17 such that a representative composition is observed in what is basically a static environment with respect to flow. Because compositional changes in the flowing fluid of interest occur relatively slowly in comparison to flow velocities, the response of the remote microbridge sensor remains timely.

Generally, with respect to the thin film microbridge or anemometer sensors such as those depicted by reference numerals 18 and 18a, recently very small and very accurate microbridge semiconductor chip sensors have been described in which etched semiconductor microbridges are used as condition or flow sensors. Such sensors might include, for example, a pair of thin film sensors flanking a thin film heater. Semiconductor chip sensors of the class described are treated in a more detailed manner in one or more of patents such as U.S. Pat. Nos. 4,478,076, 4,478,077, 4,501,144, 4,555,939, 4,651,564 and 4,683,159 all of common assignee with the present invention. To the extent necessary additional details with respect to the microbridge sensors may be incorporated by reference from these cited documents.

For the purposes of the present application, it should suffice to say that if the dynamic flow sensor 18, for example, comprises a pair of thin film sensors symmetrically flanking a thin film heater, for example, the sensor can be used to sense flow in either direction. That is, of course, provided that the chip assembly positions the sensor in the proper orientation so that the flow meets the microbridge at a right angle in the assembled meter. This further allows the flowmeter system of the present invention to be reversible with respect to the conduit system of the fluid of interest as it is then quite laterally symmetrical.

The sensor 18, then, is directly exposed to the stream of fluid flowing past it in the conduit. This sensor is used to directly measure the dynamic flow characteristics of the fluid.

The second microanemometer sensor 18a which may be mounted back-to-back with the sensor 18, as illustrated in FIG. 1, enables other parameters of the fluid to be measured simultaneously with the dynamic flow. As stated above, while the sensor 18a is not directly exposed to the flowing fluid, it is in direct communication with that fluid and can be used to measure certain parameters related to the fluid which are facilitated by a more static environment.

Such a sensor can be used for the direct measurement of thermal conductivity, k, and specific heat, $c_p$, in accordance with a technique which allows the accurate determination of both properties and a sample of interest using a single sensing system. That technique contemplates generating an energy or temperature pulse in one or more heater elements disposed in and closely coupled to the fluid medium of interest. Characteristic values of k and $c_p$ of the fluid of interest then cause corresponding changes in the time variable temperature response of the heater to the pulse. Under relatively static sample flow conditions this, in turn, induces corresponding changes in the time variable response of or more temperature responsive sensors coupled to the heater principally via the fluid medium of interest.

The thermal pulse of this source need be only of sufficient duration that the heater achieve a substantially steady-state temperature for a short time. This pulse produces both steady-state and transient conditions in the sensor. Thermal conductivity, k, and specific heat, $c_p$, can be sensed within the same sensed thermal pulse by using a steady-state temperature plateau to determine k, which is then used with the rate of change temperature in the transient condition to determine $c_p$. Such a system is described in greater detail in co-pending application Ser. No. 210,892, filed June 24, 1988 and assigned the same assignee as the present application.

In addition, it has been found that once the values of the specific heat and thermal conductivity have been determined, these measurements can be used to determine the density or specific gravity, $\rho$, or q, of the fluid of interest as a function of $c_p$, k, according to an empirical polynomial relationship. This technique is more specifically illustrated and described in patent application, Ser. No., 211,014, also filed June 24, 1988, and assigned to the same assignee as the present application.

The availability of all the measurements characterizing the fluid which can be derived from the combination of the exposed and static microanemometer sensors to the flowmeter allows for or enables one to make the determination of the corrections in accordance with the present invention. Of course, the parameters as k, $c_p$ and q, of the gas can be determined by other means if such are desirable in other applications.

Figure 2:
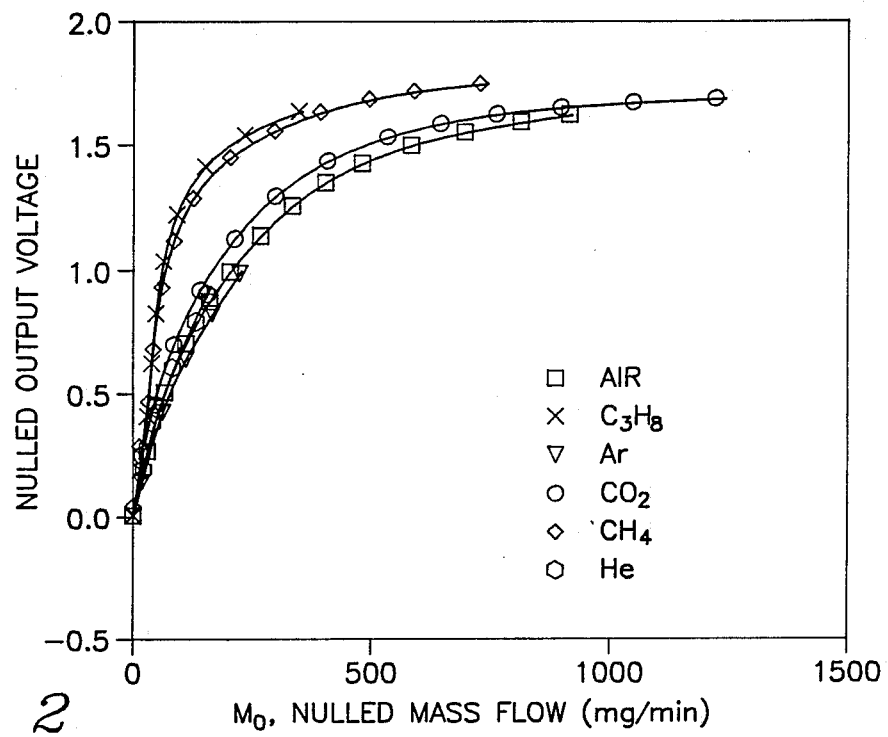
FIG. 2 is a graphic representation depicting output vs. mass flow measurement in linear coordinates, with its associated uncorrected error.
Figure 3:
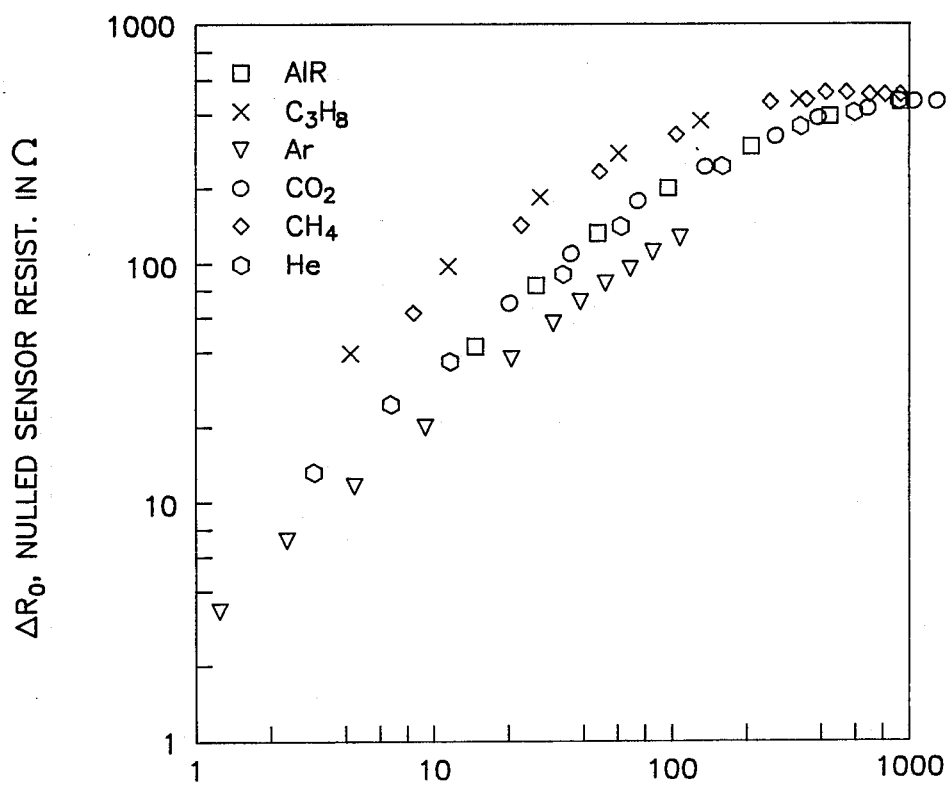
FIG. 3 shows the same data as FIG. 2 plotted as sensor resistance vs. nulled mass flow in a log-log plot in order to make the differences in data points at low flow more visible.

FIG. 2 shows the nulled sensor output plotted vs. nulled mass flow for six different gasses Of course, the same mass flow of any fluid of interest should produce the same output voltage, i.e., all curves should coincide. The raw or uncorrected data shows considerable deviation among the various gases FIG. 3 represents the data of FIG. 2 plotted as log-log functions. There the signal output is shown in terms of nulled sensor resistance rather than voltage output to expand the vertical axis. FIG. 3, demonstrates the disparities of FIG. 2 somewhat more dramatically, especially at the lower flow rates, i.e., <100 mg/min. In some cases discrepancies or errors of as much 100% or more occur at low flow rates for a given sensor output. The data of FIGS. 2 and 3 were obtained by operating the flow sensor heater at constant temperature or temperature rise above the ambient temperature.

Figure 4:
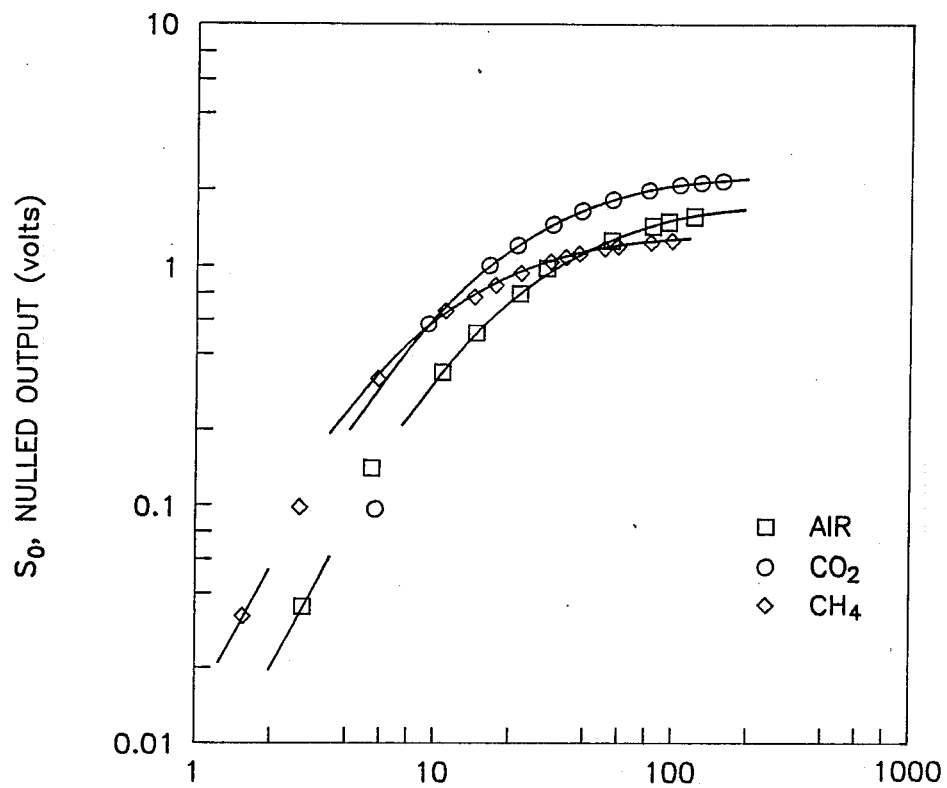
FIG. 4 shows curves of nulled mass flow vs. nulled output for several gases illustrating the basic similarity of calibration mass flow curves for diverse species.
Figure 4A:
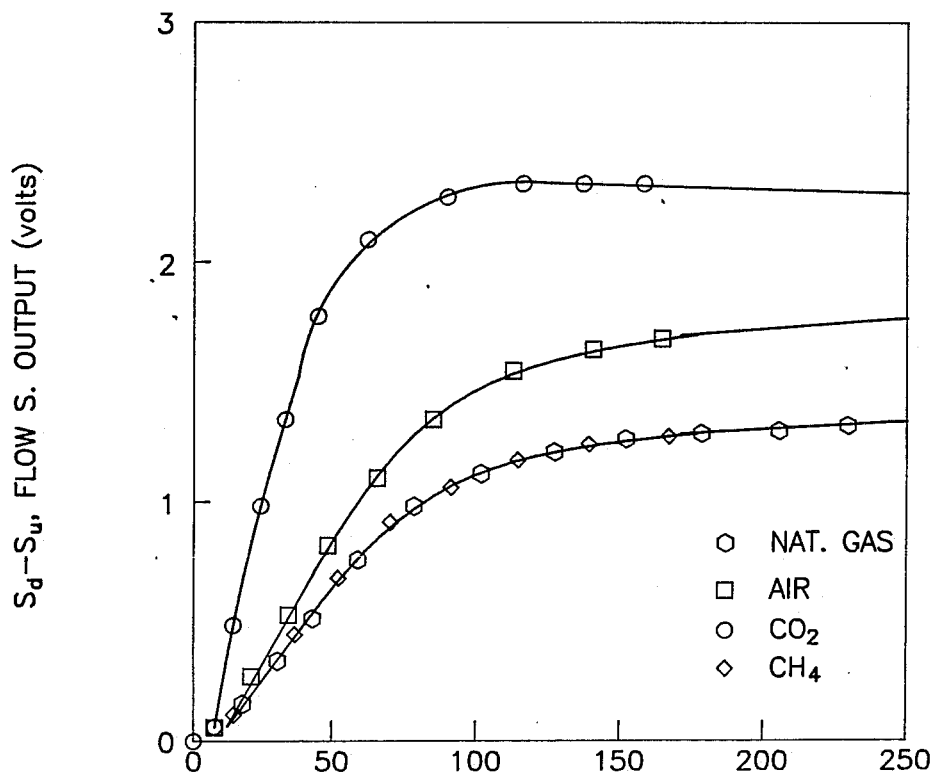
FIG. 4a shows curves of nulled volume vs. nulled output for several gases also illustrating the basic similarity of the volumetric flow curves for diverse species.

FIGS. 4 and 4a are noteworthy because it illustrates certain similarities which have been found to exist among the gases involved in the mass flow measurements. The curves, while not congruent, are strikingly similar in shape indicating some type of parallel shift especially when plotted on a log-log plot as in FIG. 4. This view is not as evident in the linear-linear plot of FIG. 4a. Complete congruency, of course, indicates consistent, error-free measurement. The similarity in shape of the nulled measurements indicates that a constant correction factor might be possible for each gas if the basis of or reasons for the variation in readings among the species were known.

According to the invention, shift correction factors in the form of simple, constant factors for each gas have been found to equilibrate mass or volumetric flow measurements with sensor output. This has been accomplished by using factors derived from the individual gas properties like k, $c_p$, and q. Additional factors may be used depending on the required accuracy of the corrected signal.

It has been found that such correction factors can be based on evaluating the least squares solution to the following expressions:

$$M^*/M_o = Ak^{X_1}c_p^{X_2}$$

$$S^*/S_o = Bk^{Y_1}c_p^{Y_2}$$

This approach was applied to correct the discrepancies of FIG. 4 as shown in Table 1, et seq, as normalized with reference to $CH_4$.

TABLE I

| FLOW CURVES SHIFT RELATIVE TO $CH_4$ | | | |
|---|---|---|---|
| | $CH_4$ | AIR | $CO_2$ |
| $M_o^*/M_o$ = | 1 | .58 | .66 |
| $S_o^*/S_o$ = | 1 | .803 | .580 |
| $V_o^*/V_o$ = | 1 | 1.50 | 1.8 |

Where:
V = volumetric
$V_o$ nulled volumetric measurement
Given the problem to find:

A, B, $X_1$, ..., $Y_1$, ... so that $$M^*/M_o = Ak^{X_1}c_p^{X_2}$$

$$S^*/S_o = Bk^{Y_1}c_p^{Y_2}$$

For any gas:

| SOLUTION: | A = $1/(k_o^{X_1} c_{po}^{X_2})$ FOR CH4 |
|---|---|
| | B = $1/(k_o^{Y_1} c_{po}^{Y_2})$ FOR CH4 |
| | $X_1$ = .6816    $X_2$ = 1.748 |
| | $Y_1$ = .7611    $Y_2$ = .01087 |

Where the subscript (o) refers to the base or reference gas. In this case the reference gas is methane.

Figure 5:
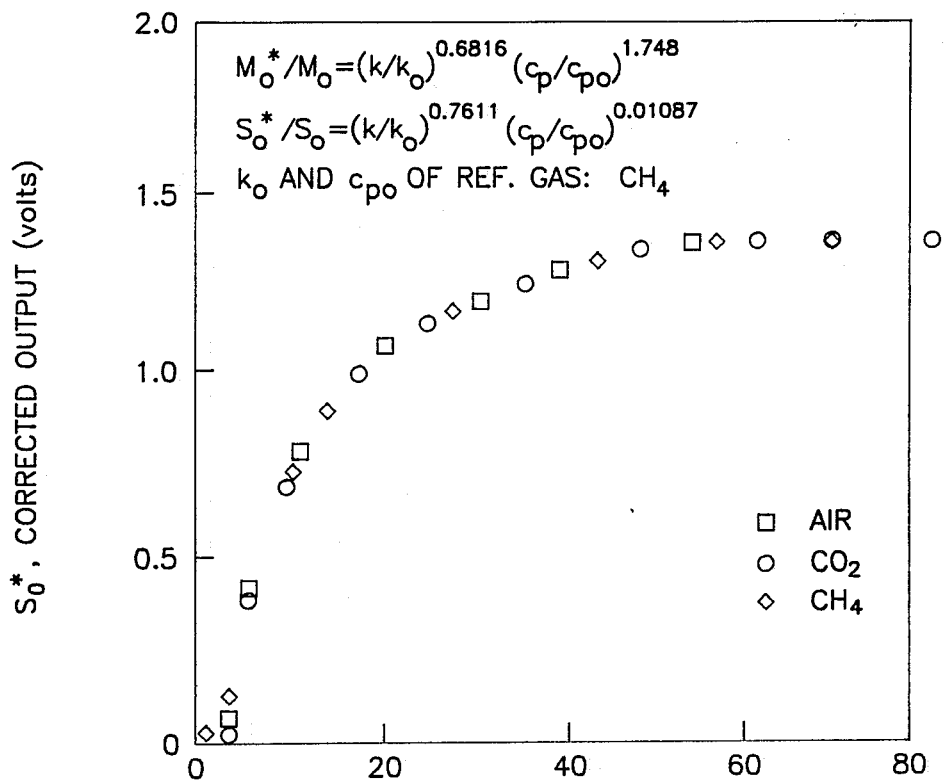
FIG. 5 shows the correlation of experimental mass flow outputs for $CO_2$ and air based on $CH_4$ applying correction factors to $M_o$ and $S_o$ based on $k$ and $c_p$ to FIG. 4.

This solution for mass flow in which the sensor is supplied in a constant current mode is reproduced graphically in FIG. 5.

Figure 6:
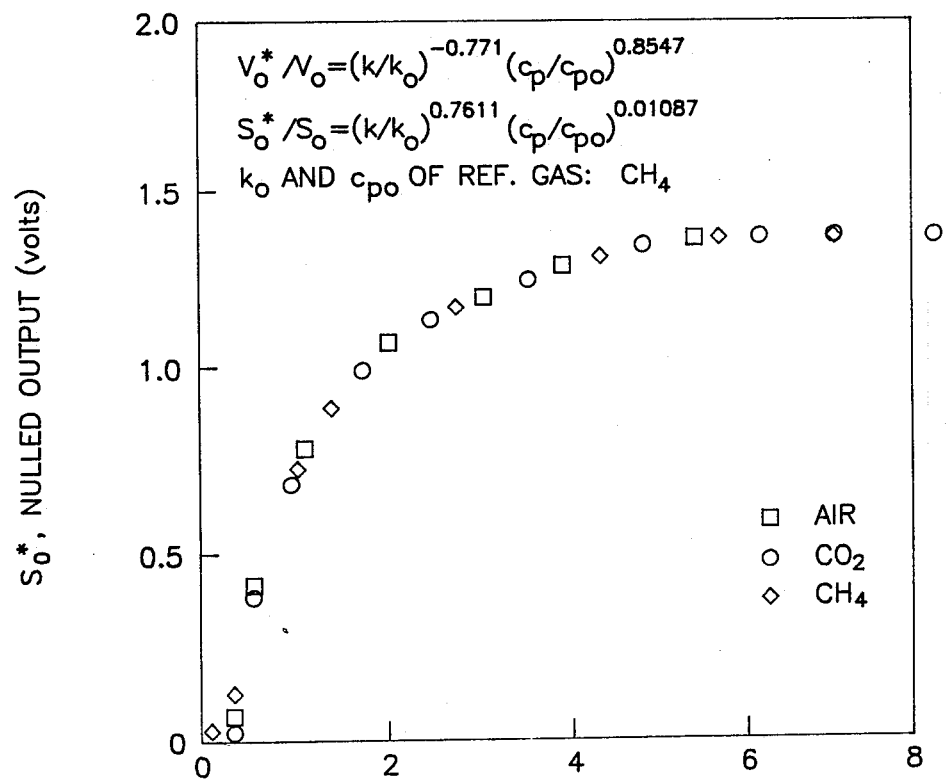

Also using $CH_4$ as the reference gas and operating the sensor in the constant current mode volumetric correlation for air, except for the natural gas data in FIG. 4a. The same set of data as in FIGS. 4a and 5 are shown in FIG. 6. This also shows good correlation. Given the number of parameters and the number of gases in this set of data, a critical scientist might question the general validity of the premise were it not for a great deal of other corroborating data. Consistency appears to verify the solution.

Figure 7:
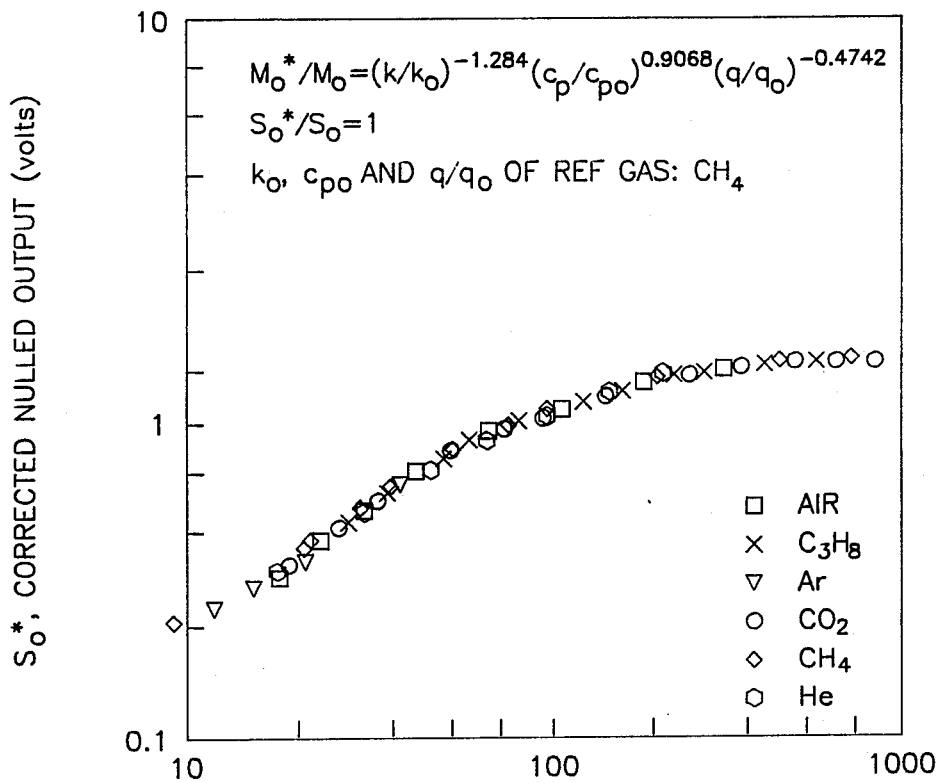
FIG. 7 depicts a corrected version of FIGS. 2 and 3 for experimental nulled microbridge sensor output vs. mass flow measurements for various gases based on supplying a correction factor based on $k$, $c_p$, and $q$, to $M_o$ only.

FIG. 7 depicts a corrected version of FIG. 3 also using $CH_4$ as the reference gas. In this case the microbridge heater was operated in a constant temperature mode rather than at constant current input. In this correction it should be noted that $S_o$ was not corrected and an additional factor with respect to density, $q/q_o$ was also used.

Figure 8:
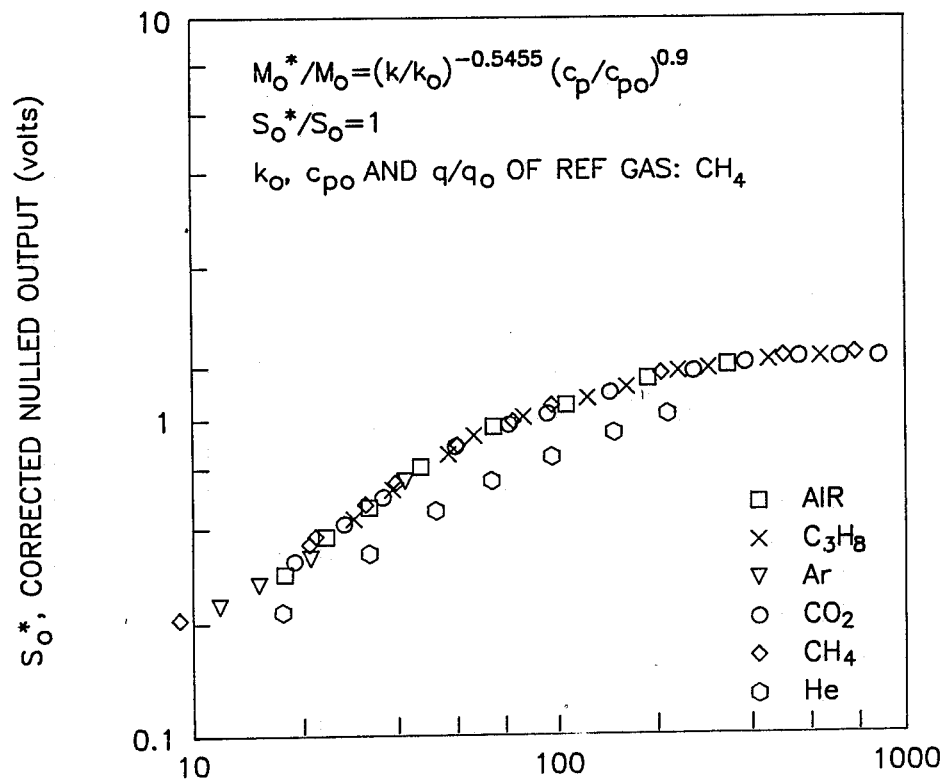
FIG. 8 depicts another solution for FIGS. 2 and 3 for experimental nulled microbridge sensor output vs. mass flow measurements for various gases based on applying a correction based on $k$ and $c_p$ only and only to $M_o$.

FIG. 8 depicts another solution or corrected version of FIGS. 2 or 3 in which the sensor is also operated in a constant temperature mode and the sensor output is uncorrected. This solution differs from that of FIG. 7 only in the elimination of the density factor, $q/q_o$. It does show some discrepancy with respect to He which is understood of in terms of its very different k and $c_p$ properties.

During operation, the above method would normally be implemented as outlined using one or more of the steps explained below, in order to convert a sensed signal, $S_o$, to a connect mass flow $M_o^*$ or volumetric flow $V_o^*$; it being further recognized that the required degree of accuracy and other considerations will occur to those applying these corrections and influence the choice of correction made on degree:

(1) Sense signal, S, and convert it to its corrected version, S*, according to any of the following alternatives based on the particular gas or combination involved;

$S_o^*/S_o = 1$ (with constant temperature heater operation)

or $$S_o^*/S_o = (k/k_o)^{Y_1}(c_p/c_{po})^{Y_2}$$

or $$S_o^*/S_o = (k/k_o)^{Y_1}(c_p/c_{po})^{Y_2}(q/q_o)^{Y_3}$$

or $$S_o^*/S_o = (k/k_o)^{Y_1}(c_p/c_{po})^{X_2}(q/q_o)^{Y_3}$$

(2.) Determine the uncorrected flow, $M_o$, by using the standard calibration curve:

$M_o = (S_o^*)$ or $V_o = (S_o^*)$ or $M_o$ or $V_o = a_0 + a_1 f_1(S_o^*) + a_2 f_2(S_o^*)$

Where $M_o$ (or $V_o$, as the case may be) are intermediate undefined quantities that resembles mass or volumetric flow but which need further corrective processing in accordance with step 3 to represent actual flow, or by iterating:

$$S^* = b_0 + b_1 g_1(M_o) + b_2 g_2(M_o) + \ldots$$

for example, a result may be $$S^* = 0 + 4.8179 \exp(-15.038/V^{.57}) - 5.1324 \exp(-44.204/V^{.6})$$

where $a_0, a_1 \ldots a_n, b_0, b_1 \ldots b_n$ are constants; $f_0, f_1 \ldots f_n$ and $g_0, g_1 \ldots g_n$ are functions.

(3) Find the corrected flow $M_o^*$ or $V_o^*$ according to the alternate $$M_o^*/M_o = (k/k_o)^{X_1}(c_p c_{po})^{X_2}$$

or $$M_o^*/M_o = (k/k_o)^{X_1}(c_p c_{po})^{X_2}(q/q_o)^{X_3}$$

or $$M_o^*/M_o = (k/k_o)^{X_1}(c_p c_{po})^{X_2}(q/q_o)^{X_3}$$

or $$V_o^*/V_o = (k/k_o)^{Z_1}(c_p c_{po})^{Z_2}$$

where $Z_1, Z_2$ are exponents

As for example in FIG. 4a $Z_1 = 0.771, Z_2 = 0.8547$ $Y_1 = 0.7611, Y_2 = 0.01087$ with $k_o$ and $c_{po}$ referring to the reference for $CH_4$, which then converted to FIG. 6.

It thus has been shown that the present invention enables great strides to be made with respect to achieving an inexpensive, very accurate, system for measuring and monitoring either mass flow or volumetric flow. This was accomplished by the recognition and solution of a problem long plaguing flow measurement. The application of known physical parameters of gases to compensate for compositional changes will enable widespread use of microanemometer flow sensors in situations heretofore closed to them.

What is claimed is:

1. A method for compensating the flow measurement of a gaseous fluid of interest for changes in the composition of that fluid in a flowmeter of the microbridge class having a first dynamic microbridge exposed to the flow and producing a flow-related output signal, comprising the steps of:

obtaining an on-going, uncorrected nulled microbridge sensor output ($S_o$) for the fluid of interest;

obtaining an on-going, uncorrected nulled mass flow value ($M_o$) or volumetric flow value ($V_o$) for the fluid of interest in relation to the microbridge sensor output;

obtaining the specific heat ($c_p$) thermal conductivity (k) and density (q); and applying a correction factor normalized with reference to a particular gas to the flowrate signal to obtain the corrected mass flow value ($M_o^*$) or volumetric flow ($V_o^*$) and sensor output $S_o^*$ according to a relationship selected from:

$$M_o^*/M_o = (k/k_o)^{X_1}(c_p c_{po})^{X_2}$$

or $$M_o^*/M_o = (k/k_o)^{X_1}(c_p c_{po})^{X_2}(q/q_o)^{X_3}$$

or $$V_o^*/V_o = (k/k_o)^{Z_1}(c_p c_{po})^{Z_2}$$

or $$V_o^*/V_o = (k/k_o)^{Z_1}(c_p c_{po})^{Z_2}(q/q_o)^{Z_3}$$

and $$S_o^*/S_o = 1$$

or $$S_o^*/S_o = (k/k_o)^{Y_1}(c_p c_{po})^{Y_2}$$

or $$S_o^*/S_o = (k/k_o)^{Y_1}(c_p c_{po})^{Y_2}(q/q_o)^{Y_3}$$

Where:
$M^*$ = corrected mass flow
$S^*$ = corrected output (sensor)
$V^*$ = corrected volumetric flow
$k/k_o$ = normalized thermal conductivity
$c_p/c_{p}0$ = normalized specific heat
$q/q_o$ = normalized density
o = refers to the base or reference gas
$x_1, x_2, x_3$, or $y_1, y_2, y_3$ or $z_1, z_2$ and $z_3$ are exponents.

2. The method of claim 1 wherein the relationship is selected from:

$$M_o^*/M_o = (k/k_o)^{X_1}(c_p c_{po})^{X_2}(q/q_o)^{X_3}$$

or $$V_o^*/V_o = (k/k_o)^{Z_1}(c_p c_{po})^{Z_2}(q/q_o)^{Z_3}$$

and
$S_o^*/S_o = 1$.

3. The method of claim 2 wherein k and $c_p$ are determined by a second microbridge means in relatively static communication with the fluid of interest.

4. The method of claim 1 wherein k and $c_p$ are determined by a second microbridge means in relatively static communication with the fluid of interest.

5. The method of claim 1 wherein the correction factors are normalized with respect to $CH_4$.

6. The method of claim 1 wherein the steps of obtaining correction factors are applied to a plurality of gases.

7. The method of claim 6 wherein said plurality of gases include $CH_4$, $CO_2$, $O_2$ air, $C_3H_8$, Ar and He.

8. The method of claim 7 wherein the correction factors are normalized with respect to $CH_4$.

9. A method for compensating the flow measurement of gaseous fluid of interest for changes in the composition of that fluid in a flowmeter having a first dynamic microbridge exposed to the flow and producing a flow-related output signal, comprising the steps of:

obtaining an on-going, uncorrected, nulled dynamic microbridge sensor output for the fluid of interest;

obtaining an on-going, uncorrected nulled mass flow value or volumetric flow value for the fluid of interest in relation to the dynamic microbridge sensor output;

obtaining the specific heat ($c_p$) and thermal conductivity (k) of the fluid of interest; and applying an on-going, time-variable correction factor to the flow value normalized with respect to a particular reference gas to obtain the corrected mass flow value or volumetric flow valve and sensor output according to a known relationship, among values of specific heat ($c_p$) and thermal conductivity (k) normalized with respect to the reference gas.

10. The method of claim 9 further comprising monitoring the density (g) of the fluid of interest.

11. The method of claim 9 wherein k and $c_p$ are determined by a second microbridge means in relatively static communication with the fluid of interest.

12. The method of claim 10 wherein k and $c_p$ are determined by a second microbridge in relatively static communication with the fluid of interest.

13. The method of claim 9 wherein the steps of obtaining correction factors are applied to a plurality of gasses.

14. The method of claim 3 wherein said plurality of gases include $CH_4$, $CO_2$, $O_2$ air, $C_3H_8$, Ar and He.

15. The method of claim 14 wherein the correction factors are normalized with respect to $CH_4$.

16. A method for compensating the flow measurement of a gaseous fluid of interest for changes in the composition of that fluid in a flowmeter having a first dynamic microbridge exposed to the flow and producing a flow-related output signal, comprising the steps of:

obtaining an on-going, uncorrected nulled microbridge sensor output ($S_o$) for the fluid of interest;

obtaining an on-going, uncorrected nulled mass flow value ($M_o$) or volumetric flow value ($V_o$) for the fluid of interest in relation to the microbridge sensor output;

obtaining the specific heat ($c_p$) and thermal conductivity (k); and applying a correction factor normalized with respect to a particular reference gas to the flowrate valve to obtain the corrected mass flow value ($M_o^*$) or volumetric flow ($V_o^*$) and sensor output $S_o^*$ according to a relationship selected from:

$$M_o^*/M_o = (k/k_o)^{x1} \cdot (c_p/c_{po})^{x2}$$

$$V_o^*/V_o = (k/K_o)^{z1} \cdot (c_p/c_{po})^{z2}$$

and $$S_o^*/S_o = 1$$

$$S_o^*/S_o = (k/k_o)^{y1} \cdot (c_p/c_{po})^{y2}$$

Where:
$M^*$ = corrected mass flow
$S^*$ = corrected output (sensor)
$V^*$ = corrected volumetric flow
$k/k_o$ = normalized thermal conductivity
$c_p/c_{po}$ = normalized specific heat
o = refers to the base or reference gas
$x_1$, $x_2$, or $y_1$, $y_2$ or $z_1$, and $z_2$ = are exponents.

17. The method of claim 13 wherein the relationship is selected from:

$$M_o^*/M_o = (k/k_o)^{X1}(c_p c_{po})^{X2}$$

or $$V_o^*/V_o = (k/k_o)^{z1}(c_p c_{po})^{z2}$$

and $$S_o^*/S_o = 1.$$

18. The method of claim 17 wherein k and $c_p$ are determined by a second microbridge means in relatively static communication with the fluid of interest.

19. The method of claim 16 wherein the correction factors are normalized with respect to $CH_4$.

20. The method of claim 16 wherein the steps of obtaining correction factors are applied to a plurality of gases.

21. The method of claim 20 wherein said plurality of gases include $CH_4$, $CO_2$, $O_2$ air, $C_3H_8$, Ar and He.

22. The method of claim 21 wherein the correction factors are normalized with respect to CH.

* * * * *